3,459,708
PHENOL-ALDEHYDE WOOD BONDING ADHESIVES INCORPORATING ORGANIC HYDROPEROXIDES AND HAVING IMPROVED CURING RATES
Malcolm P. Stevens, Bebek, Istanbul, Turkey, assignor to Chevron Research Company, San Francisco, Calif., a corporation of Delaware
No Drawing. Filed Jan. 18, 1967, Ser. No. 610,036
Int. Cl. C08g 51/74, 5/06; B32b 21/14
U.S. Cl. 260—59                                         4 Claims

ABSTRACT OF THE DISCLOSURE

Faster curing rates and shortened press times in the bonding of wood products with phenolic resin adhesives are developed by the addition of small amounts of lower organic peroxy-compounds to the resin.

BACKGROUND OF THE INVENTION

This invention relates to heat setting, resinous adhesive compositions. More specifically, it relates to hot press plywood adhesives having improved curing times comprising phenol-aldehyde resinous condensation products modified with a lower organic peroxy-compound.

The preparation and use of adhesive resins prepared from formaldehyde and phenol or urea-like compounds, also known as phenoplasts and aminoplasts, is known in the art. (See for example, The Chemistry of Phenolic Resins by Robert W. Martin, and Encyclopedia of Chemical Technology (1960), vol. X, pp. 335, 860–4, etc., edited by Kirk Othmer.) These resins are applied to surfaces, usually cellulosic, which are to be bonded, and the surface-forming material so treated is heated and submitted to elevated pressures. The foregoing operation is generally accomplished in costly mechanical devices, such as a press, and any reasonable means of shortening the functional requirements, that is, time, temperature and pressure, to any appreciable degree, even fractionally, makes possible substantial savings per unit of article produced.

It is known in the art to add soluble metal compounds, for example chromates, to the resin as accelerators for the reduction of press time in plywood manufacture and the like (cf. U.S. 2,612,481). However, for many purposes the presence of metal salts in the bond is undesirable. In these and other circumstances an accelerator composed of organic material is more suitable provided that the resulting mixture of resin and accelerator has a reasonable shelf or pot life.

DESCRIPTION OF THE INVENTION

It has now been found that the curing time of phenol-aldehyde resinous condensation product adhesives suitable for the bonding of wood or bondable wood products, such as wood veneer, is substantially reduced by the addition of an amount of a lower organic peroxy-compound based upon resin in the range of from about 0.1 to 5 weight percent. Surprisingly, the addition of minor amounts of the peroxide reduces press times by as much as 25 to 50%. More surprising, in view of the reactive nature of organic hydroperoxides in general, the pot-life of such modified resinous adhesives is not unreasonably affected.

DESCRIPTION OF PREFERRED EMBODIMENT

In a preferred embodiment of the instant invention, methylethyl ketone hydroperoxide in about 0.5 weight percent based on resin is added to an aqueous concentrate of a resol-type formaldehyde-phenol resin, as obtained in the reaction effected by heating a mixture of formaldehyde and phenol in the mol ratio of 2.25 to 1, respectively. The resulting B-stage resin containing about 44% solids, the balance being water, is representative. Organic hydroperoxide as noted above is added with efficient mixing to the resin at about ambient temperature. The resulting mixture is applied, fo rexample, to plywood sheeting in the customary manner as by brush, spraying, or dipping, and the desired number of sheets are stacked and bonded in an ordinary plywood press. Using an unmodified resin for the bonding of plywood veneer to produce ⅝" plywood, a press time of about 4.5 minutes is satisfactory. The above modified adhesive permits a reduction of the press time to 3 minutes, i.e., a 33⅓% improvement, for the production of a comparable ⅝" wood laminate.

By lower organic peroxy-compound is meant by definition t-alkyl hydroperoxides, and ketone-peroxides containing at least 3 and less than 21 carbon atoms.

By ketone-peroxides is meant the complex reaction product obtained by the acid catalyzed reaction of concentrated hydrogen peroxide with a lower ketone, i.e., $C_{3-21}$ carbon atom content (cf. Organic Peroxides by A. V. Tobolsky and R. B. Mesrobian, Interscience Publishers (1954), pp. 41–51).

By bondable wood is meant wood in the form of strips, veneer, meal, sawdust and flour, as well as leached or chemically treated solid wood having substantially unimpaired wood cellulose structural characteristics.

Like the phenol-formaldehyde resins described above, the curing times for other simple phenolic-aldehyde resins are improved by the instant modification. Thus all or part of the phenol may be replaced by ortho-, meta-, or paracresol; and all or part of the formaldehyde may be replaced by acetaldehyde or furfural. By definition, the term simple phenolic-aldehyde resins is intended to encompass these systems. Phenol-formaldehyde resins are preferred.

The amount of peroxy-compound which is desirably used varies. In general some increase in cure rate is notable after the addition of as little as about 0.1 weight percent (based upon neat resin) of the accelerator. On the other hand, the use of excessive amounts is undesirable because the resin pot-life can be impracticably shortened. In general, however, satisfactory resin pot-lives are experienced where the added accelerator constitutes less than about 5 weight percent based upon resin. Because of the relatively high cost of these peroxidic curing accelerators, amounts less than 3 percent are preferred, i.e., from about 0.1 to 3 percent.

Representative organic peroxy-compounds useful as curing accelerators include t-butyl hydroperoxide, cumene hydroperoxide, neopentyl hydroperoxide, 2,5-dimethyl-hexane-2,5-dihydroperoxide, 1,1-diethylpropyl hydroperoxide, 1,1,2,2-tetramethylpropyl hydroperoxide, methyl-cyclohexyl-1-hydroperoxide, 2-hydroperoxy-2,4-dimethyl-3-pentanone, menthanyl-8-hydroperoxide, teralin hydroperoxide, and the like tertiaryl hydroperoxides; and also includes peroxides of methylethyl ketone, diethyl ketone, di-n-butyl ketone, cyclohexanone, cyclooctanone and the like ketone hydroperoxides. Ketone peroxides are as noted above complex mixtures. For example, methylethyl ketone peroxide is a complex mixture containing mainly $(CH_3)(C_2H_5)C(OOH)_2$,
$(CH_3)(C_2H_5)(OOH)COOC(OOH)(CH_3)(C_2H_5)$,
$(CH_3)(C_2H_5)(OOH)COOC(CH_3)(C_2H_5)OOC(OOH)(CH_3)(C_2H_5)$,
$(CH_3)(C_2H_5)(OOH)COO[C(CH_3)(C_2H_5)OO]_2C(OOH)(CH_3)(C_2H_5)$,
$(CH_3)(C_2H_5)C(OH)(OOH)$, etc.

Ketone hydroperoxides are particularly preferred accelerators. Commercially supplied ketone hydroperoxides are generally complex mixtures as illustrated above for methylethyl ketone peroxide and may be in the form of ester solutions, for example, dissolved in lower alkyl phthalate esters.

Preferred t-alkyl hydroperoxides useful in the instant process are of the formula $R_1R_2R_3COOH$ in which at least 2 of the groups are alkyl groups and in which one of these groups may be an aryl group.

RESIN PREPARATION

Phenolic resins suitable for use in the preparation of the fast curing adhesive compositions of the present invention are prepared by heating a mixture of the phenol and aldehyde (usually a formalin solution) in the presence of a catalytic amount of a mineral acid (HCl or $H_2SO_4$) or base (sodium hydroxide, carbonate etc.). The mol ratio of phenol to aldehyde is generally in the range 1 to 0.2–4 respectively. Heating is continued at a temperature in the range from about 100 to 270° C. until the A-stage or B-stage resin is produced.

Base catalysis results in a resin called a "resol," and the acid catalyzed generated resin is called a "novolac." Either is suitable for the production of the fast curing adhesives herein. In plywood manufacture B-stage resins are preferred. U.S. 2,457,493, Re. 23,347 of Mar. 20, 1951, contains a representative description of resin manufacture.

Wood bonding adhesive resins as known in the art are usually extended by the addition of inert filler materials. These include wood flour, walnut shell flour and the like. As much as 20 weight percent of these fillers and higher can be added to the modified resins of the present invention without seriously affecting the desired result. These fillers add bulk to the resin, thereby facilitating handling and spreading.

In a typical operation for the production of plywood veneer, a 100 part aliquot of peroxy-modified resin obtained as described above is diluted with about 20 parts of water. To this mixture is then added with mixing about 16 parts of walnut shell flour until a smooth, lump-free mixture results. A layer of filled resin is then applied to both faces of a suitable veneer core, for example a 3/16" strip of wood veneer. Two veneer faces, each about 1/8" thick, are then placed on either side of the core, and the resulting 3-ply assembly is placed in a press at a temperature in the range from about 130–200° C. at a pressure in the range from about 150–200 p.s.i. for a period varying in the range from about 5 to 10 minutes.

In the following examples a standard research test was used for the evaluation of the resins. In the test the time required to gel the test sample is determined at a given temperature. A charge of 25 grams of the resin formulation is placed in a 6" glass test tube surrounded by a constant temperature bath. The tube is secured in place. A 2.5 gram weight is then suspended at the end of a stiff wire in the body of the resin. At the other end, the wire is attached to a reciprocating lever arm. Movement of the arm raises and lowers the suspended weight. As the resin experiences the time-temperature effect, its viscosity increases until a gel viscosity value is reached, and movement of the weight through the sample meets with increasing resistance. When the gelation value is reached, automatic switch-off and recordation of the elapsed time of the test occurs.

EXAMPLE 1

Preparation of typical phenol-formaldehyde resins (a) A 2-liter, round bottom flask, equipped with heating and cooling means, stirrer, and a temperature recording means, was charged with 483.6 grams of 90% phenol (4.63 mols), 746.6 grams of 46.5% formaldehyde (11.6 mols), 498.2 grams of water, and 193.6 grams of 50% sodium hydroxide (2.42 mols). Stirring was continued throughout the addition of the reagents and also for the remainder of the reaction. There was an immediate exotherm; and the mixture was cooled at first and then was heated to reach 100° C. in about 30 minutes. It was held at this temperature for 25 minutes, after which it was cooled to 85° C. After 45 minutes at 85° C., 55.6 grams of 50% sodium hydroxide (0.69 mol) and 22.4 grams of water were added. The mixture was cooled to 80° C. and held at this temperature until the viscosity reached a Gardner-Holdt viscosity value of Y–Z (in about 3 hours) when measured at 25° C. The pH of the resin solution was 11–12, and it had 42% solids. The purple-colored resin solution was stored at 4° C. until needed for further experimentation. This resin had a formaldehyde/phenol mol ratio of 2.5/1.

(b) Another resin was prepared in essentially the same way as in (a) except that the ratio of formaldehyde/phenol was 2.25/1; the solids content was 44%; and the viscosity was T. The portion of this resin not used for blending in succeeding examples was stored at room temperature.

EXAMPLE 2

Gel time determination

Resin blends were prepared by adding 3, 6 and 12 grams of methylethyl ketone peroxide to 1000 grams (on a dry weight basis) of the resin of Example 1(b). After complete mixing, the test resins were stored at room temperature. Periodically, the Gardner-Holdt viscosity and the gel time a 100° C. were determined. The results were as follows:

RESIN PROPERTIES

| Example | Peroxide conc., percent | Initially | | After 1 week | | After 2 weeks | | After 4 weeks | |
|---|---|---|---|---|---|---|---|---|---|
| | | Vis. (G–H) | Gel Time, (min.) | Vis. (G–H) | Gel Time, (min.) | Vis. (G–H) | Gel Time, (min.) | Vis. (G–H) | Gel Time, (min.) |
| 2a | 0 | T | 24 | U | 24 | V | 21 | Y | 17 |
| 2b | 0.3 | T | 21 | V | 21 | W | 17 | Z | 16 |
| 2c | 0.6 | T | 21 | W | 19 | X–Y | 17 | $Z_2$ | 14 |
| 2d | 1.2 | S | 17 | Z | 17 | $Z_1$ | 14 | $Z_5$ | 1–3 |

EXAMPLE 3

This experiment was carried out essentially the same as Example 2 except that 6 and 12 grams of cumene hydroperoxide were intimately mixed with 1000 grams of a second batch of resin prepared in the same way as in Example 1(b). The results were as follows:

RESIN PROPERTIES

| Example | Peroxide conc., percent | Initially | | After 1 week | | After 2 weeks | | After 4 weeks | |
|---|---|---|---|---|---|---|---|---|---|
| | | Vis. (G–H) | Gel Time, (min.) | Vis. (G–H) | Gel Time, (min.) | Vis. (G–H) | Gel Time, (min.) | Vis. (G–H) | Gel Time, (min.) |
| 3a | 0 | T | 22 | W | 21 | X | 18 | Z–$Z_1$ | 17 |
| 3b | 0.6 | T–U | 20 | W | 20 | X | 16 | $Z_1$ | 14 |
| 3c | 1.2 | T–U | 18 | W | 17 | Y | 15 | $Z_2$ | 13 |

Examples 2 and 3 illustrate that modification of phenol-formaldehyde resins by the peroxidic materials of the present invention shorten the gel time by 6% to 33% with only a slight increase in the rate of storage viscosity buildup as compared to unmodified resins. In the case of cumene hydroperoxide modified resin, the increase in viscosity is the same as that of the unmodified resin. This is a decided advantage where long pot life and short cure times are desired.

EXAMPLE 4

The resin prepared in Example 1(a) was used for the following tests. The indicated peroxide was mixed with this resin at the concentrations indicated on a dry solids basis. A tube containing the test mixtures was placed in the gel time tester with the bath at 100° C. The results were as follows:

| Example | Peroxide Name | Conc., percent | Gel time, minutes |
|---|---|---|---|
| 4a | None | 0 | 19 |
| 4b | Methylethyl ketone peroxide | 0.3 | 14 |
| 4c | do | 0.6 | 12 |
| 4d | do | 1.2 | 9 |
| 4e | do | 3.0 | 6 |
| 4f | Cumene Hydroperoxide | 0.6 | 14 |
| 4g | do | 1.2 | 13 |
| 4h | do | 3.0 | 10 |
| 4i | t-butyl hydroperoxide | 0.6 | 12 |

EXAMPLE 5

Attempts to mix the resin of Example 1(a) with 30% hydrogen peroxide or with 40% peracetic acid resulted in an immediate and substantial increase in viscosity at room tempertaure. These results indicated an unsatisfactory pot life.

EXAMPLE 6

The test procedure previously described was followed except that the water bath was maintained at 80° C. instead of 100° C. In this case, the resin of Example 1(a) had a gel time of 107 minutes. Methylethyl ketone peroxide and cumene hydroperoxide at a concentration of 1.2% reduced this gel time to 51 and 75 minutes, respectively. The same materials at 3% concentration reduced the time still further to 17 and 46 minutes, respectively.

EXAMPLE 7

Preparation and testing of plywood

Resorcinol is a well-known material used by the plywood industry to shorten the time required to cure a phenol-formaldehyde resin. In comparative experiments, plywood was made using as an adhesive a phenol-formaldehyde resin modified by 2.7% resorcinol or by 0.6, 0.4, and 0.2% methylethyl ketone peroxide. The plywood was 5-ply, ⅝" thick, prepared at a 3-minute and a 15-minute assembly time. It was pressed at 150° C. for 4½ minutes at 170 p.s.i. pressure. Although the weight of the peroxide used was but a fraction of the weight of resorcinol used, in all cases the peroxide modificed resin performed at the least as well as the resorcinol modified resin. Strength tests carried out immediately after manufacture and after a boil cycle showed greater than 85% wood failures and less than 15% glue line failures.

As will be evident to those skilled in the art, various modifications of this invention can be made or followed, in the light of the foregoing disclosure and discussion, without departing from the spirit or scope of the disclosure or from the scope of the following claims.

I claim:

1. The composition obtained by mixing into a phenol-formaldehyde adhesive resin, based upon the resin, from about 0.1 to 5 weight percent of an organic peroxy-compound selected from the group consisting of methylethyl ketone peroxide, 1-butyl hydroperoxide, and cumene hydroperoxide, wherein said resin consists essentially of the product obtained from the reaction of phenol with formaldehyde and is selected from the group consisting of resol and novolac resins.

2. The composition as in claim 1 further characterized in that said adhesive is a resol resin and said added compound is methylethyl ketone peroxide.

3. The composition as in claim 1 further characterized in that said adhesive is a resol resin and said added compound is cumene hydroperoxide.

4. The composition as in claim 1 further characterized in that said adhesive is a resol resin and said added compound is t-butyl hydroperoxide.

References Cited

UNITED STATES PATENTS 3,281,496   10/1966   Rice et al. _____ 260—845

WILLIAM H. SHORT, Primary Examiner

H. SCHAIN, Assistant Examiner

U.S. Cl. X.R.

161—262; 260—17, 29, 38, 56

PO-1050
(5/69)

UNITED STATES PATENT OFFICE
CERTIFICATE OF CORRECTION

Patent No. 3,459,708         Dated August 5, 1969

Inventor(s) MALCOLM P. STEVENS

It is certified that error appears in the above-identified patent and that said Letters Patent are hereby corrected as shown below:

Col. 2, line 7, "fo rexample" should read --for example--.

Col. 4, line 49, "a 100°C." should read --at 100°C.--.

Col. 4, Example 2d, last column, "$1_3$" should read --13--.

Col. 5, line 34, "tempertaure" should read --temperature--.

Col. 6, line 9, "modificed" should read --modified--.

Col. 6, line 25, Claim 1, "1-butyl" should read --t-butyl--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents